United States Patent
Dahan et al.

(10) Patent No.: US 11,362,978 B2
(45) Date of Patent: Jun. 14, 2022

(54) METHOD FOR DELETING AND RE-POSTING TEXT MESSAGES IN DIALOG BOXES

(71) Applicants: Meir Dahan, Adi (IL); Eliahu Antopolsky, Zichron Yaakov (IL)

(72) Inventors: Meir Dahan, Adi (IL); Eliahu Antopolsky, Zichron Yaakov (IL)

( * ) Notice: Subject to any disclaimer, the term of this patent is extended or adjusted under 35 U.S.C. 154(b) by 57 days.

(21) Appl. No.: 16/856,015

(22) Filed: Apr. 22, 2020

(65) Prior Publication Data

US 2021/0336913 A1    Oct. 28, 2021

(51) Int. Cl.
| | |
|---|---|
| *H04L 51/00* | (2022.01) |
| *H04L 51/043* | (2022.01) |
| *G06F 3/0482* | (2013.01) |
| *H04L 51/18* | (2022.01) |

(52) U.S. Cl.
CPC ............ *H04L 51/16* (2013.01); *G06F 3/0482* (2013.01); *H04L 51/043* (2013.01); *H04L 51/18* (2013.01)

(58) Field of Classification Search
CPC ....... H01L 51/16; H01L 51/043; H01L 51/18; G06F 3/0482
See application file for complete search history.

(56) References Cited

U.S. PATENT DOCUMENTS

| | | | | |
|---|---|---|---|---|
| 9,590,956 | B1 * | 3/2017 | Ryan | G06F 21/602 |
| 10,003,964 | B1 * | 6/2018 | Blintsov | H04L 63/0442 |
| 2012/0304080 | A1 * | 11/2012 | Wormald | H04L 63/104 |
| | | | | 715/758 |
| 2013/0117392 | A1 * | 5/2013 | Aceves | H04L 51/30 |
| | | | | 709/206 |
| 2014/0012932 | A1 * | 1/2014 | Sharaf | H04L 51/32 |
| | | | | 709/206 |
| 2015/0319141 | A1 * | 11/2015 | Jang | H04L 63/0421 |
| | | | | 726/26 |
| 2015/0350163 | A1 * | 12/2015 | Brander | H04L 63/0428 |
| | | | | 726/1 |
| 2015/0350251 | A1 * | 12/2015 | Brander | G06F 16/955 |
| | | | | 713/168 |
| 2016/0191442 | A1 * | 6/2016 | Penilla | H04L 51/22 |
| | | | | 709/206 |
| 2017/0353416 | A1 * | 12/2017 | Brooks | H04L 67/10 |
| 2017/0353423 | A1 * | 12/2017 | Morrison | G06F 16/951 |
| 2018/0018694 | A1 * | 1/2018 | Berry, Jr. | G06Q 30/0204 |
| 2018/0081529 | A1 * | 3/2018 | Zhang | G06F 3/0482 |
| 2020/0242219 | A1 * | 7/2020 | Kaczynski | H04L 51/046 |

* cited by examiner

*Primary Examiner* — June Sison

(57) ABSTRACT

A method for managing text messages of a chat between a user and a contact of an instant messaging application that provides the option to apply a secret chat mode on the messages that are written or recorded and displayed in the dialog boxes after applying the secret mode. The method indicates on the screens of the computing devices of the user and the contact that the chat is under the secret chat mode. The method deletes from the dialog boxes the text messages that are under the secret chat mode upon receiving a deleting command from the user or the contact. The deleting command may be automatically created when the user or the contact leaves the chat. The method stores these text messages and re-posts them upon receiving a mutual re-posting command from both the user and the contact.

11 Claims, 3 Drawing Sheets

METHOD FOR DELETING AND RE-POSTING TEXT MESSAGES IN DIALOG BOXES

TECHNICAL FIELD

The present invention refers to a method for deleting and re-posting text messages of a chat between a user and a contact of an instant messaging software application.

BACKGROUND ART

Many users of instant messaging software applications, such as Messenger™, Snapchat™, WhatsApp™, Telegram™ and the like, send one to the other messages, such as text messages, voice messages, video messages, photos, videos, emojis and the like. Sometimes the user wants send messages to his or her contact that contain sensitive information that the user would prefer that the contact will not show these messages to third parties. The present invention provides a solution for this problem.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The term "computing device" refers to any kind of smartphone, mobile device or a computer that is designed to have an internet connection. The term "processing device" refers to a processing device on a server or on the computing devices, or both.

Figure 1:
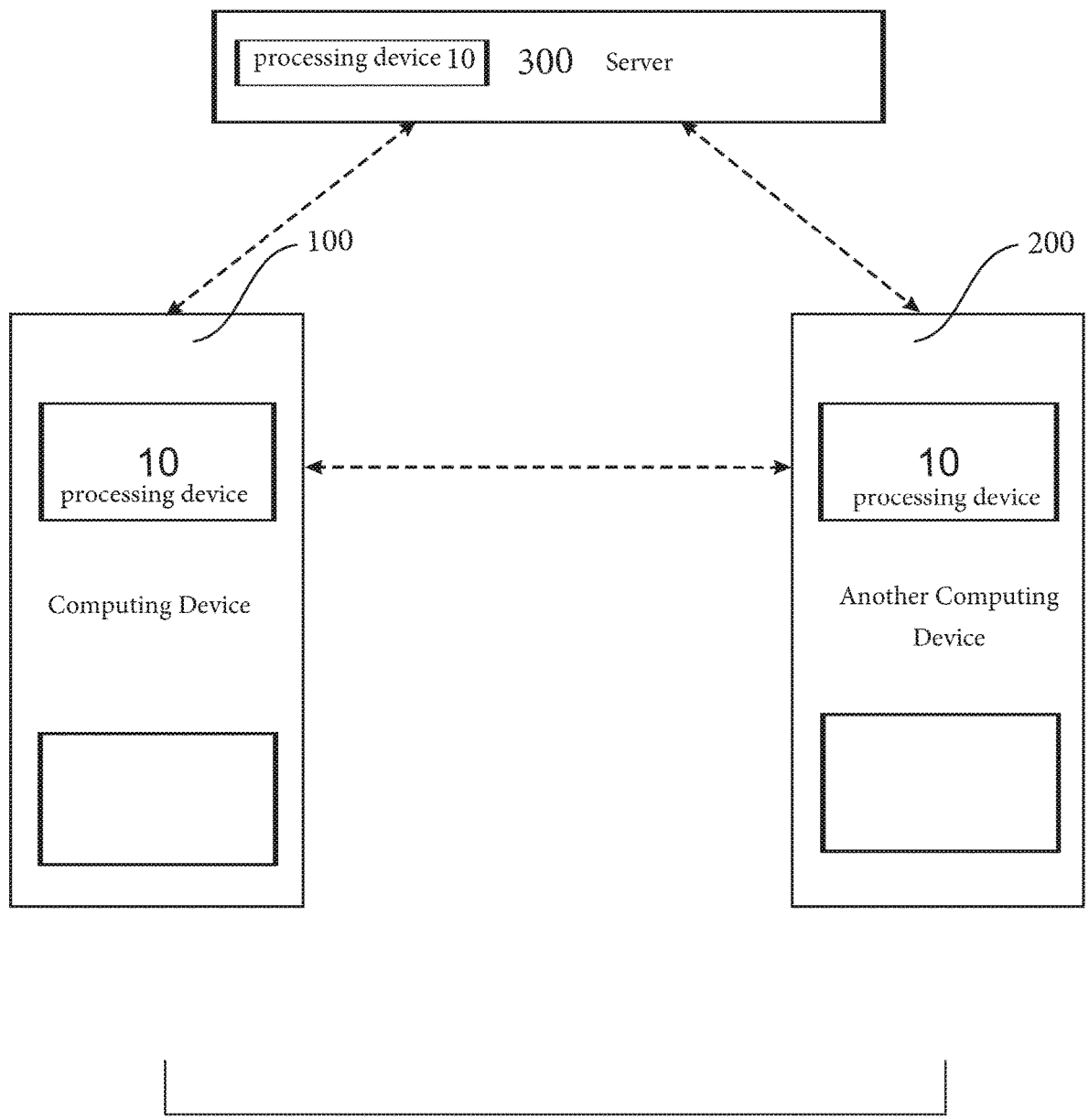
FIG. 1 is a block diagram that shows the computing device of the user (100), the computing device of the contact (200) and the remote server (300), each one of them with a processing device (10).

The main object of the present invention is to provide a method for managing outgoing text messages of a chat between a user and his or her contact of an instant messaging software application that is performed by processing devices (10) running on a computing device of the user (100), on a computing device of the contact (200) and/or on a remote server (300). It is possible to implement the present invention to many kind of message, such as text messages, voice messages, video messages, photos, videos, emojis and the like, but nevertheless the term "text messages" hereinafter and in the claims refer to text messages, or to voice messages, or both. FIG. 1 depicts schematically the computing device of the user (100), the computing device of the contact (200) and the remote server (300), each one of them with a processing device (10).

The method subject matter of the present invention is designed primarily to be implemented in new or existing instant messaging software applications. The method may include one or more of the following features:

(a) The method provides an option to the user of the instant messaging software application to apply a secret chat mode on the outgoing text messages (101) from the user to the contact wherein said outgoing text messages, written or recorded, are displayed in the dialog box of the user (102) and in the dialog box of the contact (202) after applying the secret chat mode. Selecting the secret chat mode may be done by touching a button or an icon on the screen of the computing device, by touching the screen of the computing device in a certain way, by tilting the computing device in a certain way, or in any other way that is commonly used to select an option on mobile devices.

(b) When the user selects the secret chat mode then the method indicates on the screen (103) of the computing device of the user that the chat between the user and the contact is now under the secret chat mode. The indication (400) may be in a variety of visual or sound types for example. For example, the background of the dialog box can be different, the color of the text messages itself will be different, the font of the text messages will be different, a symbol on the screen and the like. Few of these examples of indications also enable the user to see and realize which part of the text messages is under the chat secret mode.

(c) The method deletes from the dialog box of the contact the outgoing text messages that are under the secret chat mode, but this upon and after receiving a deleting command from the computing device of the user or from the computing device of the contact. It is possible and preferable for example that the deleting command will be automatically created when the user leaves his or her dialog box or when the contact leaves his or her dialog box. By that, as long as the user and his or her contact are chatting the contact can see those text messages from the user in his or her dialog box and when they finish the chat, means when the user or the contact leaves the dialog box, then the outgoing text messages from the user will be automatically deleted from the dialog box of the contact.

(d) It is possible and even more polite that when the user selects the secret chat mode then the method indicates also on the screen (203) of the computing device of the contact that the chat is now under the secret chat mode.

(e) The method may have the option to store in one or more of the processing devices the outgoing text messages that are under the secret chat mode, and to re-post them in the dialog box of the contact, but this upon receiving a re-posting command from the computing device of the user. These steps are needed for example in case when the user and the contact want to refresh their memory as to the content of the outgoing text messages that were deleted.

(f) Mutuality is a perfect ground for good relationships and therefore it is preferably that the method will apply equality on both parties, so that the method will manage the outgoing text messages and the incoming text messages (201) of the chat between the user and his or her contact.

Therefore, when the user selects the chat secret mode then this mode will apply on the outgoing text messages from the user to the contact and on the incoming text messages from the contact to the user, means that the mode will apply on these messages, written or recorded, that are displayed in the dialog box of the user and in the dialog box of the contact after applying the secret chat mode. The indication will be shown on the screens of the computing devices of the user and of the contact. Upon receiving the deleting command the method will delete from the dialog box of the contact and from the dialog box of the user the outgoing text messages and the incoming text messages, which are under the secret chat mode.

According to the mutuality concept, the method may have the option to store in one or more of the processing devices the outgoing text messages and the incoming text messages, that are under the secret chat mode, and to re-post them in the dialog boxes of the contact and of the user, but this upon receiving a mutual re-posting command from the computing device of the user and from the computing device of the contact.

It is possible for example to use an option for the user and the contact that when they are together in the dialog boxes between them then they can press on an icon and they can see several options, for example: (a) re-post all the deleted messages; (b) re-post all the deleted messages of the last week; (c) re-post all the deleted messages of the last month; (d) re-post all the deleted messages from a specific date [and the method may enable to type or choose a specific date]; and if they both will choose the same option then those deleted messaged will be re-posted again, and possibly be deleted again when one of them leaves his or her dialog box, and so forth.

Figure 2:
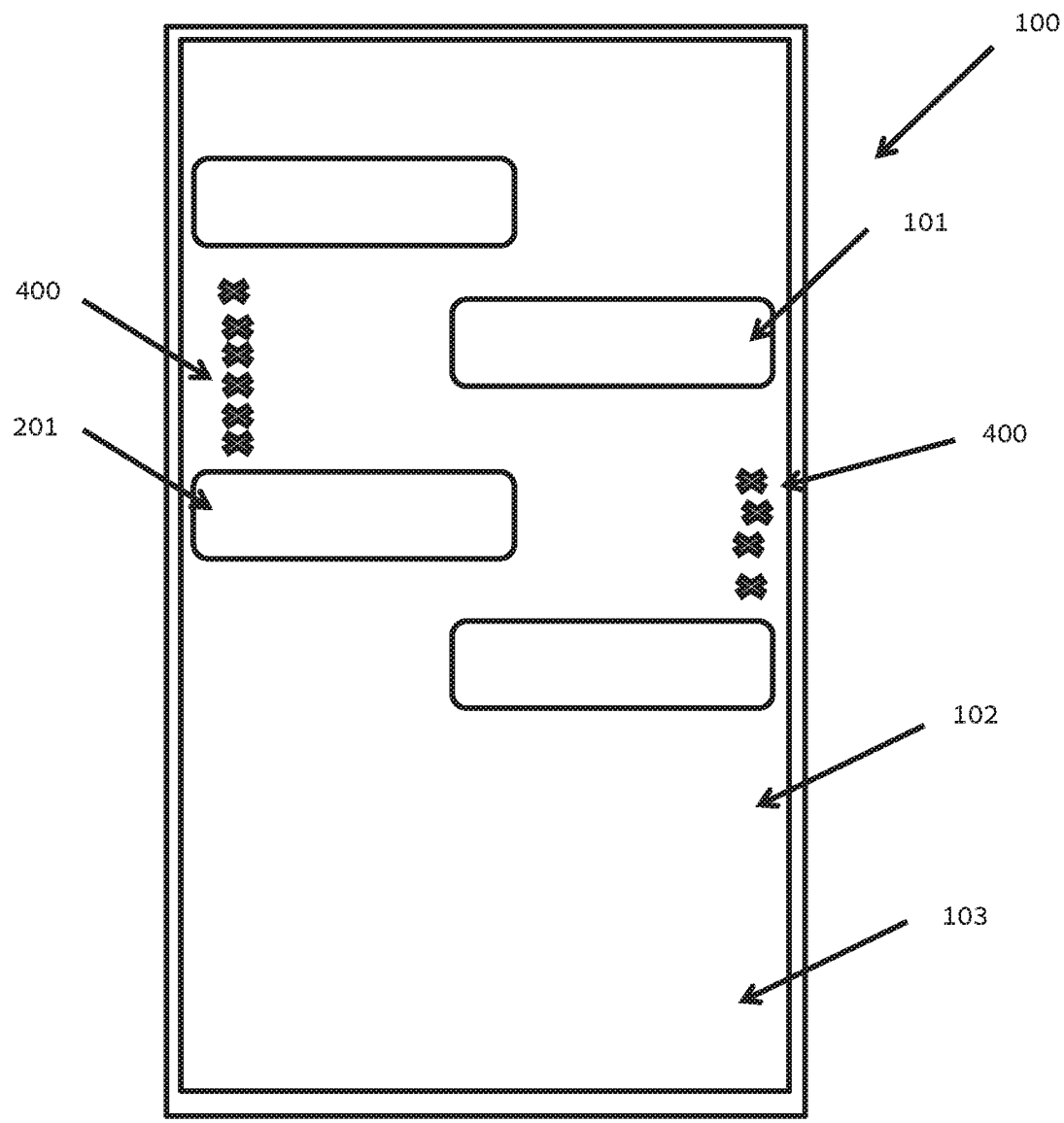
FIG. 2 depicts schematically the user's computing device (100).
Figure 3:
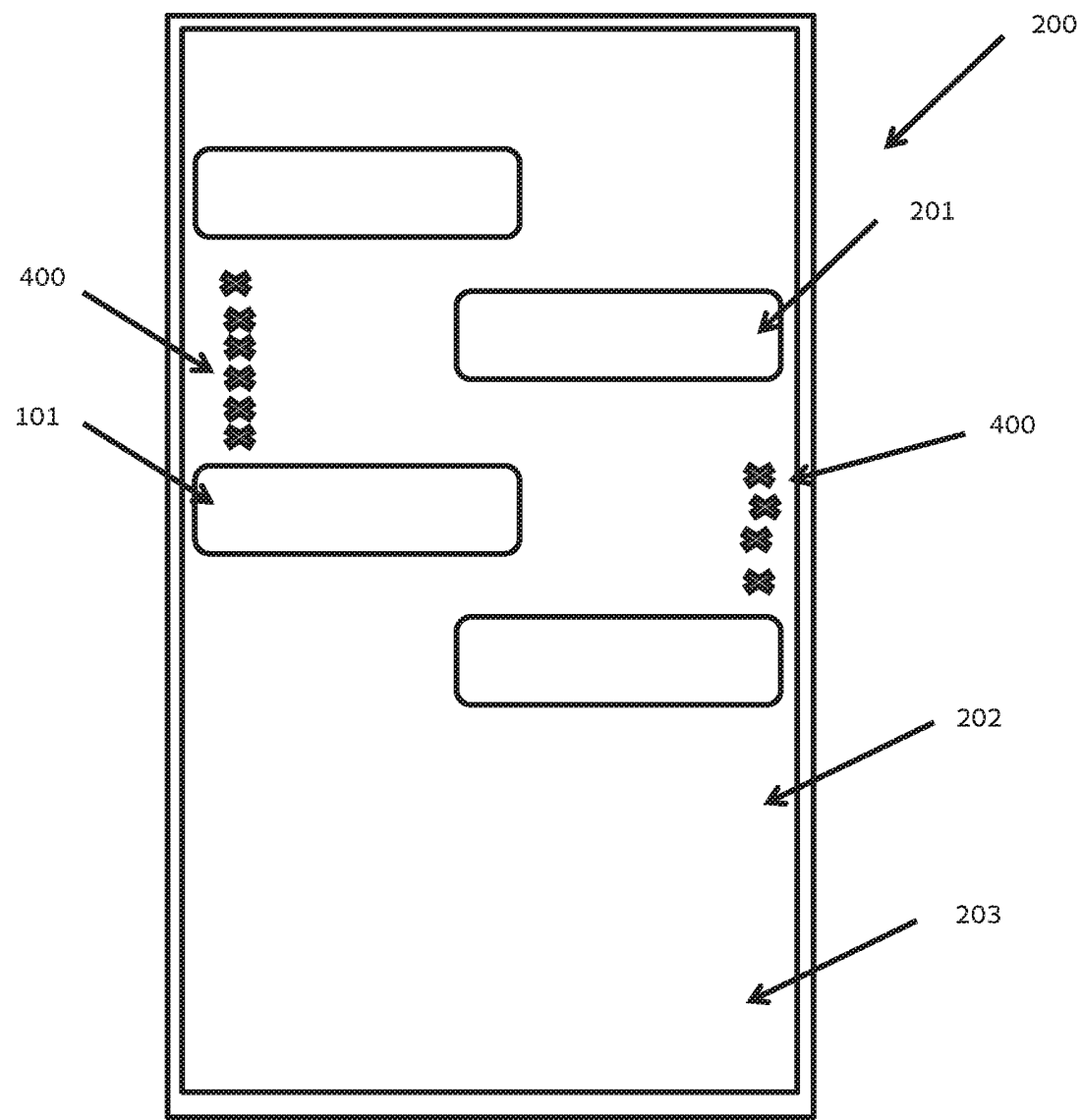
FIG. 3 depicts schematically the contact's computing device (200).

FIG. 2 depicts schematically the user's computing device (100) and FIG. 3 depicts schematically the contact's computing device (200), when the indicators (400) are a kind of symbols with the form of the letter X that represent that the messages in this area are under the secret chat mode.

What is claimed is:

1. A method for deleting and re-posting of instant messages of a chat between a user and a contact of a communication application that is performed by processing devices running on a server and computing devices of the user and the contact, said method comprising:
   (a) displaying in dialog boxes of the user and the contact one or more outgoing instant messages from the user to the contact and one or more incoming instant messages from the contact to the user by using the computing devices of the user and the contact so as to digitally display in the dialog boxes of the user and the contact both the one or more outgoing instant messages and the one or more incoming instant messages;
   (b) transmitting to the server by using the computing devices of the user and the contact both the one or more outgoing instant messages and the one or more incoming instant messages;
   (c) applying a re-post secret chat mode on the one or more outgoing instant messages and the one or more incoming instant messages, wherein said re-post secret chat mode is applied by the user by touching a button or an icon on a screen of the computing device of the user, wherein the initiation of the re-post secret chat mode is configured to:
      (i) cause the server to save in the server both the one or more outgoing instant messages and the one or more incoming instant messages, and to cause the server or the computing devices of the user and the contact to delete from the dialog boxes of the user and the contact both the one or more outgoing instant messages and the one or more incoming instant messages; and
      (ii) cause a signal to be indicated on the screen of the computing device of the contact that the chat is now under the re-post secret chat mode;
   (d) sending a digital re-posting command from both the user and the contact to the server, receiving from the server to the computing devices of the user and the contact both the one or more outgoing instant messages and the one or more incoming instant messages that were stored on the server; and
   (e) re-posting in the dialog boxes both the one or more outgoing instant messages and the one or more incoming instant messages by using the computing devices of the user and the contact that digitally re-post in the dialog boxes of the user and the contact both the one or more outgoing instant messages and the one or more incoming instant messages upon receipt of the digital re-posting command received from both the user and the contact.

2. The method according to claim 1 wherein the instant messages are selected from the group consisting of messages generated by instant messaging software, text messages, voice messages, video messages, photos, videos, and emojis.

3. The method according to claim 1, wherein the outgoing and incoming instant messages are stored in the one or more of the processing devices.

4. The method according to claim 1, wherein the initiation of the re-post secret chat mode is also configured to cause the background of the dialog box to be different when in the secret chat mode so that the color or font of the instant messages will be different from the instant messages prior to the application of the secret chat mode.

5. The method according to claim 1, wherein the re-posting is in a mode selected from the group consisting of:
   (i) re-posting of specific deleted messages;
   (ii) re-posting all the deleted messages of the last day;
   (iii) re-posting all the deleted messages of the last week;
   (iv) re-posting all the deleted messages of the last month; and
   (v) re-posting all the deleted messages from a specific date.

6. The method according to claim 1, wherein the re-posting is in a mode wherein the user and the contact must choose the same re-posting mode in order to have said deleted messaged to be re-posted in said mode.

7. The method according to claim 1, further comprising:
   (f) causing said re-posted deleted messages to be deleted again when either the user or the contact leaves his or her dialog box.

8. A method for deleting and re-posting of instant messages of a chat between a user and a contact of a communication application that is performed by processing devices running on a server and computing devices of the user and the contact, said method comprising:
   (a) displaying in dialog boxes of the user and the contact one or more outgoing instant messages from the user to the contact and one or more incoming instant messages from the contact to the user by using the computing devices of the user and the contact so as to digitally display in the dialog boxes of the user and the contact both the one or more outgoing instant messages and the one or more incoming instant messages;
   (b) transmitting to the server by using the computing devices of the user and the contact both the one or more outgoing instant messages and the one or more incoming instant messages;
   (c) applying a re-post secret chat mode on the one or more outgoing instant messages and the one or more incoming instant messages, wherein said re-post secret chat mode is applied by the user by touching a button or an icon on a screen of the computing device of the user, wherein the initiation of the re-post secret chat mode is configured to:
      (i) cause the server to save in the server both the one or more outgoing instant messages and the one or more incoming instant messages, and to cause the server or the computing devices of the user and the contact to delete from the dialog boxes of the user and the contact both the one or more outgoing instant messages and the one or more incoming instant messages; and (ii) cause a signal to be indicated on the screen of the computing device of the contact that the chat is now under the re-post secret chat mode;

(d) sending a digital re-posting command from both the user and the contact to the server, receiving from the server to the computing devices of the user and the contact both the one or more outgoing instant messages and the one or more incoming instant messages that were stored on the server;

(e) re-posting in the dialog boxes both the one or more outgoing instant messages and the one or more incoming instant messages by using the computing devices of the user and the contact that digitally re-post in the dialog boxes of the user and the contact both the one or more outgoing instant messages and the one or more incoming instant messages upon receipt of the digital re-posting command received from both the user and the contact, wherein the re-posting is in a mode selected from the group consisting of (i) reposting of specific deleted messages; (ii) re-posting all the deleted messages of the last day; (iii) re-posting all the deleted messages of the last week; (iv) re-posting all the deleted messages of the last month; and (v) re-posting all the deleted messages from a specific date; and wherein the re-posting is in a mode wherein when the user and the contact must choose the same re-posting mode in order to have said deleted messaged to be re-posted; and (f) causing said re-posted deleted messages to be deleted again when either the user or the contact leaves his or her dialog box.

9. The method according to claim 8, wherein the initiation of the re-post secret chat mode is also configured to cause the background of the dialog box to be different when in the secret chat mode so that the color or font of the instant messages will be different from the instant messages prior to the application of the secret chat mode.

10. The method according to claim 8 wherein the instant messages are selected from the group consisting of messages generated by instant messaging software, text messages, voice messages, video messages, photos, videos, and emojis.

11. The method according to claim 8, wherein the outgoing and incoming instant messages are stored in the one or more of the processing devices.

\* \* \* \* \*